No. 723,578. PATENTED MAR. 24, 1903.
G. A. BRACHHAUSEN.
STOP MECHANISM FOR MUSIC BOXES.
APPLICATION FILED JUNE 27, 1902.
NO MODEL. 2 SHEETS—SHEET 1.

WITNESSES:
J. A. Kehlenbeck
John Lotka

INVENTOR
Gustav A. Brachhausen
BY
Briesen Knauth
ATTORNEYS

No. 723,578. PATENTED MAR. 24, 1903.
G. A. BRACHHAUSEN.
STOP MECHANISM FOR MUSIC BOXES.
APPLICATION FILED JUNE 27, 1902.
NO MODEL. 2 SHEETS—SHEET 2.
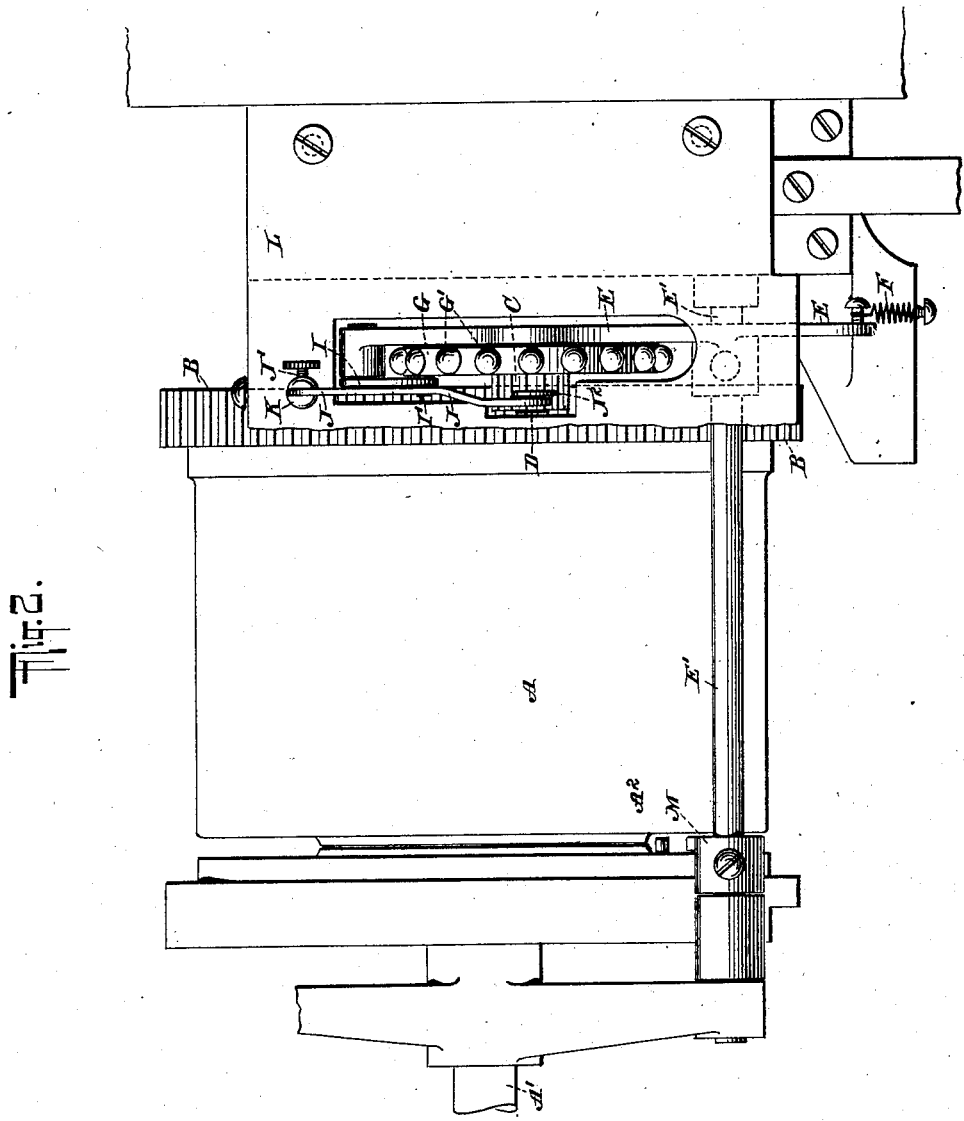
WITNESSES:
John A. Kehlenbeck
John Lotka
INVENTOR
Gustav A. Brachhausen
BY
Briesen & Knauth
ATTORNEYS

UNITED STATES PATENT OFFICE.

GUSTAV A. BRACHHAUSEN, OF RAHWAY, NEW JERSEY, ASSIGNOR TO REGINA MUSIC BOX COMPANY, OF RAHWAY, NEW JERSEY, A CORPORATION OF NEW JERSEY.

STOP MECHANISM FOR MUSIC-BOXES.

SPECIFICATION forming part of Letters Patent No. 723,578, dated March 24, 1903.

Application filed June 27, 1902. Serial No. 113,422. (No model.)

*To all whom it may concern:*

Be it known that I, GUSTAV A. BRACHHAUSEN, a citizen of the United States, residing in Rahway, Union county, and State of New Jersey, have invented certain new and useful Improvements in Stop Mechanisms for Music-Boxes, of which the following is a specification.

My invention relates to music-boxes, and has for its object to provide a mechanism for positively stopping the motion of the sheet or disk at the end of a piece, even if the sheet or disk were improperly inserted, so that the playing of the piece did not begin at the right point. While my invention is applicable to any music-box having a note-sheet, whether in the shape of a disk or not, it is of particular utility when applied to a music-box having a plurality of note-sheets which are brought into position successively by means of a carriage.

A specific embodiment of my invention is shown in the accompanying drawings, in which—

Figure 1:
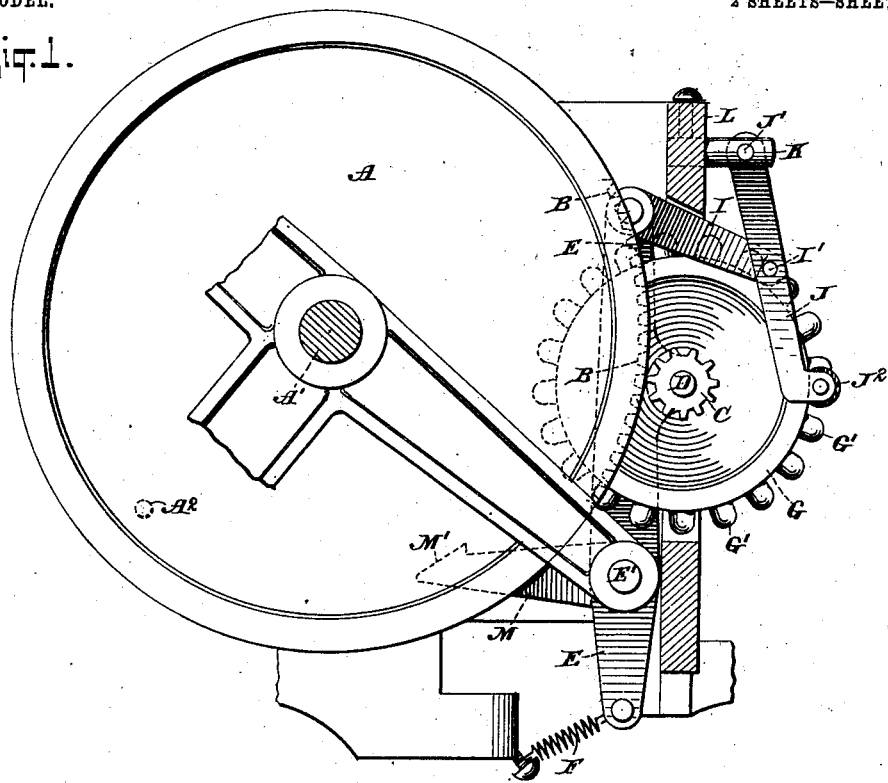
Figure 3:
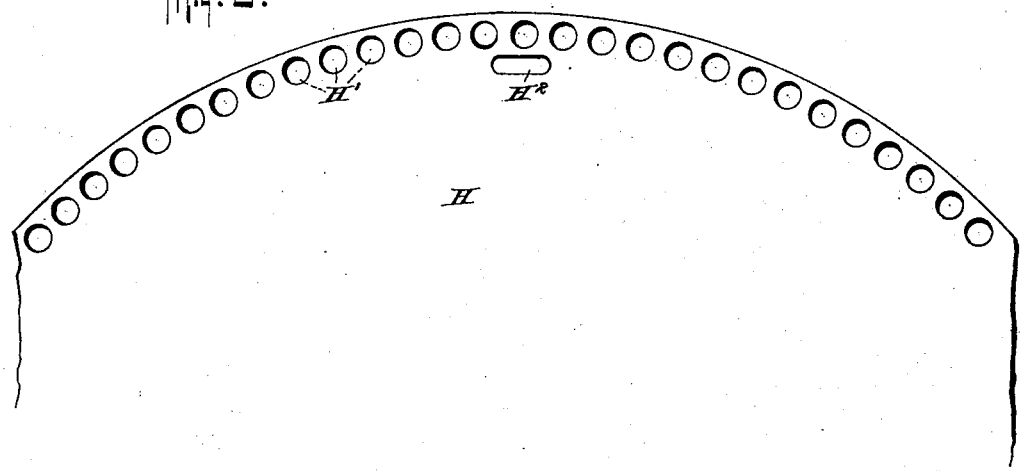

Figure 1 is a side elevation, partly in section, of so much of a music-box as is sufficient to illustrate my invention. Fig. 2 is a front view of the mechanism, and Fig. 3 is a partial face view of a music-disk arranged to coöperate with the mechanism shown in Figs. 1 and 2. It will be understood that my invention is not limited to the particular construction shown and that the scope of the invention is indicated in the appended claims.

A indicates the ordinary spring-drum or any other suitable mechanism connected with a motor. A' is the axis of this drum.

B is a large gear-wheel formed on or secured to the periphery of the drum.

C is a pinion which is adapted to be moved into and out of engagement with the gear-wheel B. For this purpose the pinion C is mounted on a shaft D, which is journaled on an arm E, fulcrumed at E' upon the frame of the machine and under the influence of a spring F, tending to throw the pinion C away from the gear-wheel B. Rigidly connected with the pinion C is a wheel or disk G, having teeth or balls G', which are adapted to engage the customary apertures H' in the tune-disk H. The upper end of the arm E is pivotally connected with a link I, which has another pivotal connection I' with an arm J, fulcrumed at J' upon a bracket K, secured to frame L. The free end of the lever J extends adjacent to the plane of rotation of the wheel G and is preferably provided with a wheel or roller J², arranged to engage the solid portion of the note-sheet H. The latter is provided with a slot H², into which the free end of the lever J or the roller J², when the latter is used, is adapted to project—that is, the position of the slot H² relatively to the apertures H' is the same as that of the wheel J² relatively to the teeth or balls G'.

I have not illustrated the mechanism for starting and stopping the spring-drum, as this mechanism forms no part of the invention claimed herein and as many constructions available for this purpose are well known to those skilled in the art. It will be sufficient to say that the ordinary stopping and starting mechanism is so arranged that the drum A and the note-disk H will be given a complete revolution at each operation. If the note-sheet were always inserted properly, the apparatus would always work as intended. If, however, the note-sheet were started in a wrong position a complete revolution of the note-sheet would obviously carry it to a point distant from the beginning of the piece. A wrong insertion of a note-sheet is not very likely to occur when the insertion is done by hand; but when automatic mechanism is employed for this purpose, as is the case with music-boxes having a carriage for a plurality of note-sheets and mechanism for transferring the note-sheets from the carriage to the playing position, the danger of accidentally starting a piece at the wrong place is much greater. Now assuming that such a case should happen my present invention will remedy the defect above referred to, since as soon as the end of the piece is reached the roller J² will project into the slot H² under the influence of the spring F, and this will carry the pinion C out of engagement with the gear-wheel B, so that the pinion and music-disk will be stopped, nothwithstanding the fact that the drum A continues to revolve. The roller J² will then also act in conjunction with the teeth G' to hold the note-sheet steady until it is removed from the playing position. Thus by my invention any note-sheet that should be in a wrong position is automatically stopped at such a point that it will remain in the proper position for the next operation. If the sheet being in the proper position is raised to contact with the wheel G, the roller J² will of course project through the slot H², and thus the pinion C will at first be out of contact with the gear-wheel B. In order to start the note-sheet in this case, there is provided on the pivot or shaft E' of the arm E a starting-arm M, provided with inclined face M', which is adapted to be engaged by a pin A² on the drum A. Thus when during the rotation of the drum the pin A² engages the inclined face M' the arm E, with the pinion C and with the roller J², is swung inward, so as to release the note-sheet from the roller J² and to bring the pinion C into engagement with the gear-wheel B. When the pin A² clears the inclined face M', the spring F will tend to throw the pinion C out of engagement with the gear-wheel B; but as the roller J² is then in engagement with the solid portion of the note-sheet H the pinion C will remain in the driving position until the slot H² reaches its initial position.

What I claim as new, and desire to secure by Letters Patent, is—

1. In a music-box, the combination with the music-sheet having slot H², and mechanism for imparting rotary motion to the music-sheet, of means controlled by the said slot in the music-sheet for arresting the said music-sheet.

2. In a music-box, the combination with a note-sheet having slot H², of a toothed wheel arranged to drive the music-sheet, a pinion mounted to rotate with said toothed wheel, an arm on which said pinion and toothed wheel are journaled, a gear-wheel arranged for driving engagement with said pinion, a spring having a tendency to throw the pinion out of engagement with the gear-wheel, and a controlling member connected with said arm and arranged to engage the slot in note-sheet near the line of engagement of said note-sheet with the toothed wheel.

3. In a music-box, the combination with a driving gear-wheel, of an arm mounted to swing toward and from said gear-wheel, a spring having a tendency to throw said arm outward, a driven wheel adapted for engagement with said gear-wheel, means connected with said driven wheel for imparting motion to a note-sheet, a controlling-lever fulcrumed on the frame and provided with a portion arranged to engage a slotted portion of the note-sheet, and a link connecting said controlling-lever with said arm.

4. In a music-box, the combination with a driving mechanism, of a driven mechanism movable into and out of engagement with the driving mechanism, a note-sheet arranged to be driven by said driven mechanism and provided with a slotted portion, a controlling member arranged to engage the music-sheet at the slotted portion thereof and connected with the driven mechanism so as to share the movement of this mechanism toward and from the driving mechanism, whereby the note-sheet itself will, through the medium of said controlling member, bring the driven mechanism out of engagement with the driving mechanism at the end of the piece.

5. In a music-box, the combination with a driving mechanism, of a driven mechanism movable into and out of engagement with the driving mechanism, a note-sheet arranged to be driven by said driven mechanism and provided with a slotted portion, a controlling member arranged to engage the music-sheet at the slotted portion thereof and connected with the driven mechanism so as to share the movement of this mechanism toward and from the driving mechanism, whereby the note-sheet itself will, through the medium of said controlling member, bring the driven mechanism out of engagement with the driving mechanism at the end of the piece, and a starting mechanism comprising a member operatively connected with the driven mechanism and arranged to be engaged by a portion of the driving mechanism so as to bring the driven mechanism and the driving mechanism into operative engagement with each other, notwithstanding the fact that the controlling member may be in that position in which it causes the driving mechanism and the driven mechanism to be out of engagement with each other.

6. In a music-box, the combination with the driving mechanism, of a music-sheet, mechanism, substantially as described, for imparting motion to the music-sheet, a device controlled by the music-sheet for bringing the driving mechanism and the driven mechanism into and out of operative relation, so as to positively stop the music-sheet at the end of a piece, and a starting mechanism operated by the driving mechanism for establishing a driving connection between the driving mechanism and the driven mechanism, irrespective of the device controlled by the note-sheet.

In testimony whereof I have signed my name to this specification in the presence of two subscribing witnesses.

GUSTAV A. BRACHHAUSEN.

Witnesses:
JOHN LOTKA,
EUGENE EBLE.